(No Model.)

H. W. HAKES.
OCTAVE COUPLER.

No. 545,888.          Patented Sept. 10, 1895.

Witnesses
A. C. Whiting.
Emma Kistel.

Inventor
Hudson W. Hakes.
By his Attorney
Rufus B. Fowler.

UNITED STATES PATENT OFFICE.

HUDSON W. HAKES, OF MILLBURY, ASSIGNOR TO ANDREW H. HAMMOND, OF WORCESTER, MASSACHUSETTS.

OCTAVE-COUPLER.

SPECIFICATION forming part of Letters Patent No. 545,888, dated September 10, 1895.

Application filed April 24, 1894. Serial No. 508,896. (No model.)

*To all whom it may concern:*

Be it known that I, HUDSON W. HAKES, a citizen of the United States, residing at Millbury, in the county of Worcester and State of Massachusetts, have invented certain new and useful Improvements in Octave-Couplers, of which the following is a specification.

My invention relates to octave-couplers for reed-organs, &c., and more particularly to an improved metallic device for attaching the coupler-wires to the coupler-table.

The object of my invention is to provide an improved device, made of metal, which will not only attach the coupler-wires to the coupler-table, but will also form a complete bearing for the wires to turn in, independent of the coupler-table upon which the wires ordinarily rest and turn, and will also pinch and rigidly hold the ends of the felt bushing to prevent any movement thereof.

My invention consists in certain novel features of construction of my improved device for attaching coupler-wires, and more particularly in making an attaching device with a cylindrical head, which forms a complete bearing for the coupler-wire, independent of the coupler-table, and two downwardly-extending legs, between which the ends of the felt bushing, which extends around the wire, are pinched and rigidly held, when said legs are inserted in a single hole in the coupler-table, as will be hereinafter fully described.

Figure 1:
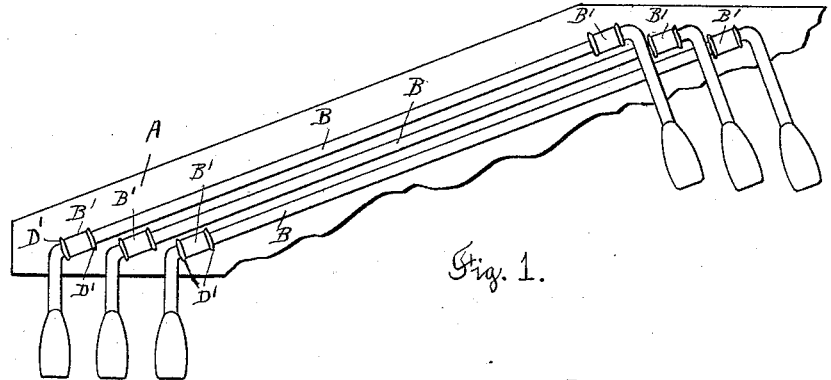
Figure 2:
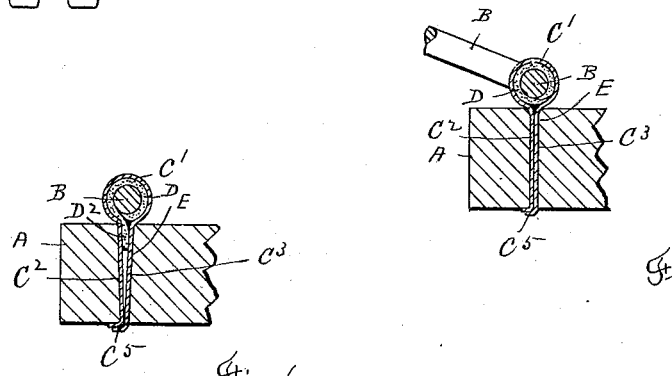
Figure 6:
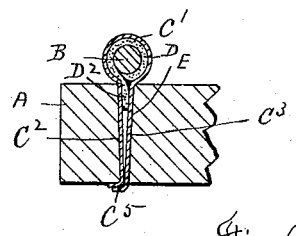
Figure 3:
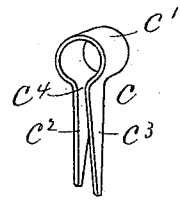
Figures 4, 5:
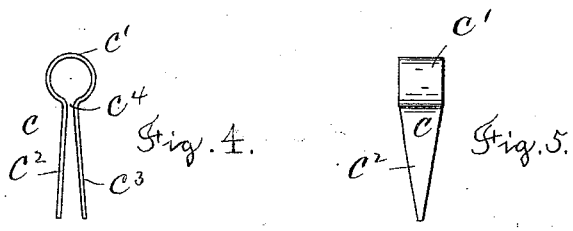

Referring to the drawings, Figure 1 is a plan view of a portion of an octave-coupler provided with my improved attaching devices. Fig. 2 is a vertical section through the table, coupler-wire, felt bushing, and one of my attaching devices. Fig. 3 is a perspective view of one of the attaching devices detached. Fig. 4 is an edge view. Fig. 5 is a side view; and Fig. 6 corresponds to Fig. 2, but shows one end of the felt bushing pinched between the legs of the attaching device. Figs. 2 to 6 are shown on an enlarged scale.

In the accompanying drawings, A is a portion of the coupler-table and B the coupler-wires, which are arranged parallel to each other and adapted to have a rotary motion in bearings $B'$.

My invention, as above stated, relates to the attaching device C, forming the bearing $B'$. Said device is made of flat spring metal and of substantially the shape shown in the drawings, having the cylindrical head $C'$ and the two downwardly-extending legs $C^2$ $C^3$, with pointed ends, which are pressed together and inserted in a single hole in the coupler-table when the fastening device is applied. When the legs $C^2$ $C^3$ are pressed together, the divided portions of the cylindrical head $C'$ will be brought together, as shown at $C^4$, Fig. 4, to form a complete circle, within which the coupler-wire is supported and has its bearing. A piece of felt D encircles the coupler-wire within the head $C'$ and prevents any contact of the metal surfaces. In order to hold the felt D in place within the head $C'$ and prevent it from working out, I have one or both ends of the felt extend below the head $C'$ and between the upper part of the legs $C^2$ $C^3$, (see Fig. 6,) so that said ends will be pinched between said legs when they are brought together and inserted in the single hole in the coupler-table. It will be understood that a series of holes, as E, are made in the coupler-table, into which the legs $C^2$ $C^3$ of the attaching device C are inserted after the said device has been fitted to the coupler-wire and felt bushing which extend within the circular head $C'$. The ends of the legs $C^2$ $C^3$ may be bent over or clinched, as shown at $C^5$, to secure the device in the coupler-table.

The advantages of my attaching device for coupler-wires will be readily appreciated by those skilled in the art. It is of very simple construction and inexpensive to manufacture, and furnishes a complete bearing for the coupler-wire, independent of the coupler-table, and also holds the ends of the felt bushing and prevents any movement thereof.

The devices may be readily applied to the coupler-wires and felt bushings, which extend through the circular heads, and the legs are pressed together by the thumb and finger of the operator from the upper end of the device, and then the pointed ends thereof inserted in a hole in the coupler-board, the wires and bushings being supported while the legs are driven down.

Having thus described my invention, what I claim as new, and desire to secure by Letters Patent, is—

1. An improved metallic device for attaching coupler wires to the coupler table of octave couplers, comprising a circular head through which the coupler wire, and the felt bushing encircling said wire are adapted to extend, and two legs, between which the ends of the felt bushing are adapted to be pinched and held, substantially as set forth.

2. An improved metallic device for attaching coupler wires to the coupler table of octave couplers, comprising a circular head through which the coupler wire, and the felt bushing encircling said wire are adapted to extend, said head forming a complete bearing for the coupler wire, independent of the coupler table, and two legs between which the ends of the felt bushing are adapted to be pinched and held, substantially as set forth.

3. The combination with the coupler table, coupler wires, and felt bushings around said wires, of metallic attaching devices, comprising a cylindrical head encircling the felt bushing and coupler wire, and forming a complete bearing for said wire independent of the coupler table, and two legs adapted to be pressed together to pinch the ends of the felt between them, and to be inserted in one hole in the coupler board, substantially as set forth.

HUDSON W. HAKES.

Witnesses:
RUFUS B. FOWLER,
HENRY W. FOWLER.